US008589706B2

(12) United States Patent
Zhang et al.

(10) Patent No.: US 8,589,706 B2
(45) Date of Patent: Nov. 19, 2013

(54) DATA INVERSION BASED APPROACHES FOR REDUCING MEMORY POWER CONSUMPTION

(75) Inventors: Ming Zhang, Sunnyvale, CA (US); Chris Wilkerson, Portland, OR (US); Greg Taylor, Portland, OR (US); Randy J. Aksamit, Chandler, AZ (US); James Tschanz, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1366 days.

(21) Appl. No.: 11/964,551

(22) Filed: Dec. 26, 2007

(65) Prior Publication Data

US 2009/0172449 A1    Jul. 2, 2009

(51) Int. Cl.
*G06F 1/32*    (2006.01)

(52) U.S. Cl.
CPC .................................. *G06F 1/3203* (2013.01)
USPC ........................................ 713/320; 713/323

(58) Field of Classification Search
USPC ........... 713/500–501, 300–340; 711/101, 154
See application file for complete search history.

(56) References Cited

U.S. PATENT DOCUMENTS

| | | | | |
|---|---|---|---|---|
| 5,426,755 A * | 6/1995 | Yokouchi et al. | ............. | 711/101 |
| 5,740,118 A * | 4/1998 | Sato et al. | ..................... | 365/222 |
| 5,890,005 A * | 3/1999 | Lindholm | ..................... | 713/320 |
| 6,256,252 B1 * | 7/2001 | Arimoto | ....................... | 365/227 |
| 6,292,868 B1 * | 9/2001 | Norman | ........................ | 711/103 |
| 6,490,703 B1 * | 12/2002 | de la Iglesia et al. | ......... | 714/746 |
| 6,587,385 B2 * | 7/2003 | Ooishi | ........................... | 365/191 |
| 6,657,911 B2 * | 12/2003 | Yamaoka et al. | ............. | 365/226 |
| 6,678,202 B2 * | 1/2004 | Scott | ............................. | 365/229 |
| 6,732,288 B2 * | 5/2004 | de la Iglesia et al. | ............. | 714/2 |
| 6,768,144 B2 * | 7/2004 | Houston et al. | ................ | 257/207 |
| 6,889,331 B2 * | 5/2005 | Soerensen et al. | ............ | 713/320 |
| 6,909,662 B2 * | 6/2005 | Sugiyama | ............... | 365/230.05 |
| 7,039,818 B2 * | 5/2006 | Deng et al. | ..................... | 713/320 |
| 7,280,412 B2 * | 10/2007 | Jang et al. | ................ | 365/189.07 |
| 7,400,541 B2 * | 7/2008 | Jang et al. | ................ | 365/189.07 |
| 7,523,324 B2 * | 4/2009 | Ma | .................................. | 713/300 |
| 2003/0009617 A1 * | 1/2003 | Cohen | .......................... | 711/105 |
| 2004/0017234 A1 * | 1/2004 | Tam et al. | ..................... | 327/141 |
| 2007/0271421 A1 * | 11/2007 | Kim et al. | ..................... | 711/154 |
| 2008/0098244 A1 * | 4/2008 | Clinton et al. | ................ | 713/320 |

* cited by examiner

*Primary Examiner* — Raymond Phan
(74) *Attorney, Agent, or Firm* — Blakely, Sokoloff, Taylor & Zafman LLP

(57) ABSTRACT

Disclosed herein are approaches to reducing a guardband (margin) used for minimum voltage supply (Vcc) requirements for memory such as cache.

19 Claims, 2 Drawing Sheets

DATA INVERSION BASED APPROACHES FOR REDUCING MEMORY POWER CONSUMPTION

BACKGROUND

The present invention relates generally to power saving methodologies for memory such as cache systems. In some embodiments, it provides a cache organization with a non-intrusive power management interface.

Memory systems such as static random access memory (SRAM) cache using cells such as the so-called 6T, 4T, or other, typically have a minimum required Vcc when in operation. Due to factors (e.g., aging, di/dt voltage droop, IR drop, and process variation) that reduce how much voltage the memory system actually sees, a guardband (or error margin) is added to the specified minimum supply to account for worst case conditions. For example, with some processor cache, guardbands of up to 100 mV may be employed, i.e., added to the minimum required Vcc. Accordingly, solutions for reducing utilized guardbands may be desired.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
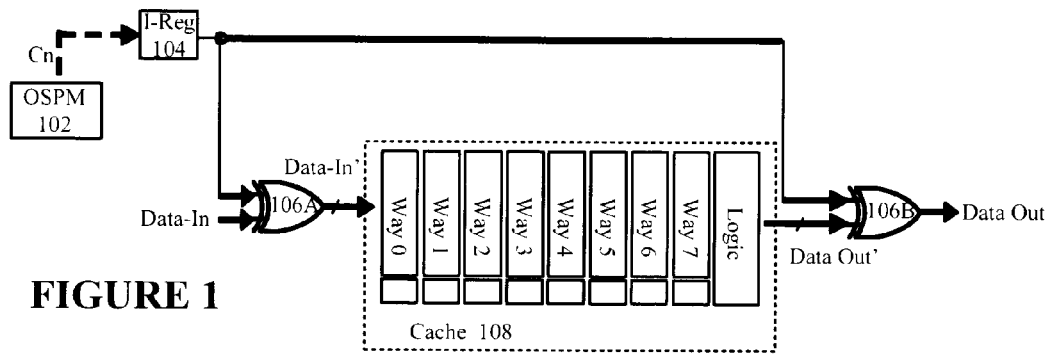
FIG. 1 is a schematic diagram of a portion of a cache system with an inversion circuit to mitigate impact of conditions [or protect against conditions . . . ] contributing to increased guardband in accordance with some embodiments.

Disclosed herein are approaches to reducing a guardband (margin) used for minimum voltage supply (Vcc) requirements for memory such as cache (e.g., L1, L2, or other). In some embodiments, during normal operation, when coming out of a mode where the memory was "flushed" (e.g., a reduced power or inactive mode), the data written back into the memory is inverted on different occasions, e.g., alternate times when the memory is re-activated. This continues for an extended duration, e.g., lifetime of the memory, which, from a statistical standpoint, increases the likelihood that the data bias for the memory will be better balanced, thereby impeding the effects of aging and thus reducing the needed Vcc guardband that would otherwise be required.

In some embodiments, another independent approach is to de-activate a portion of the memory when less performance is required, e.g., when the processor is operating at a lower frequency. With memory such as cache, the required minimum Vcc increases as the amount of active memory is increased. Thus, if less memory is needed during an active (albeit lower performance) state, a portion of the memory is de-activated, allowing the Vcc guardband, in turn, to be reduced.

Both approaches allow for a lower memory supply voltage when the memory is operating, which results in less overall power consumption.

Data Inversion

Data bias is the percentage of time that a given state, e.g., "1" is stored in a bit cell over a period of time, e.g., the life of the cell. The data bias can have an important impact on the bit cell's aging. An imbalanced data bias (e.g. 25% "1") will skew the voltage transfer curves of the cell's inverters more than a balanced data bias (i.e. 50% "1"). This results in more detrimental aging effects, requiring a higher supply voltage guardband for the memory. In fact, for a cache system using a minimum supply (Vcc) of around or below 1.0 V, simulations demonstrated that the guardband (margin added to this amount to overcome worst-case conditions, aging, etc.) could be lowered by at least 15-45 mV in going from a data bias of 25% to one of 50%.

Thus, in some embodiments, a circuit is provided to flip (invert) the bits in the memory on a regular basis. For example, it may be inverted when coming out of an inactive mode, on different occasions, when the memory is re-populated. With cache in many processor platforms, especially mobile platforms, the processors may be frequently transitioned in and out of active cache modes, thereby providing an opportunity for sufficiently regular inversion, which may result in improved data biases. For example, with mobile computers using ACPI (Advanced Configuration Power Interface) C states, aging is a relatively slow process compared to the frequency of C6 transitions (especially those on mobile products) and thus, the statistical likelihood that the data bias will be balanced is fairly good.

(The "ACPI" specification provides for different power management states for different platform levels, e.g., system, processor, devices. The so-called C states define activity for a processor or core within a processor. The C0 state is the state of highest activity, while the C6 state is the state of lowest activity, with the other states falling in line between these states. It should be appreciated that other power management specifications could be employed, and the invention is not so limited.)

FIG. 1 shows a circuit for implementing data inversion that is triggered from power activity changes in accordance with some embodiments. The circuit generally comprises an operating system power management module (OSPM) 102, register (e.g., one or more flip-flops) 104, XOR gates 106 (input gate 106A and output gate 106B), and cache system 108, coupled together as shown. (Any or all of these logic circuits may or may not be hardened.) The cache system 108 comprises multiple partitions (or "Ways"), eight in this depiction, along with control logic, to control data written into and out from the cache system.

The cache receives data at an input port (Data In') and provides it from an output port (Data Out'). The input and output ports may comprise any suitable number of bits (e.g., 1, 2, 4, 8, etc.), and thus, the XOR gates 106 likewise comprise a corresponding number of gates. That is, each depicted XOR gate may actually correspond to a number of gates in parallel supporting the number of bits on the data input and output ports.

Figure 2:
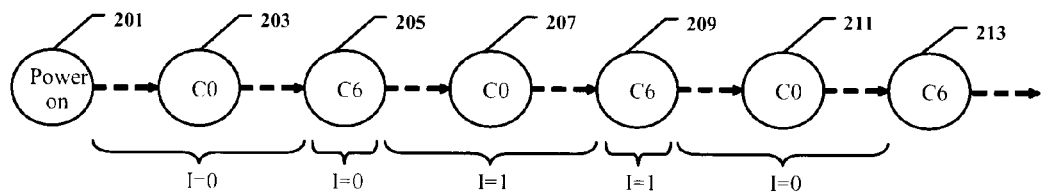
FIG. 2 is a state diagram showing a way for controlling the inversion circuit of FIG. 1 in response to power state changes in accordance with some embodiments.

The OSPM (operating system power management) module is a module that is aware of the current C state for the processor. Circuitry is provided (e.g., within the module) to generate a Cn signal to control the register 104 to toggle its data whenever the system transitions from C6 to C0 (as shown in FIG. 2). (It should be appreciated that while an OCPM module is shown, any other suitable circuit or module, depending on the particularly implemented power management scheme, could be used.)

The I register output is coupled to an input at both XOR gates (106A, 106B). The other input to XOR gate 106A is coupled to the Data In line, while the other input to XOR gate 106B is coupled to the Data Out' line. The output from XOR 106A is coupled to Data In' (input to cache 108), and the output from XOR 106B provides the Data Out signal.

In operation, when the register 104 is de-asserted ('0), the XOR gates simply buffer the data into and out of the cache and no inversion occurs. On the other hand, when the register is asserted ('1), data written into the cache is inverted before being stored in the cache and then inverted again, back to its original value by XOR 106B when read out from the cache. Thus, from the standpoint of the computing system writing data into and out from the cache, the inversion circuitry and process is transparent, i.e., Data Out corresponds to Data In, regardless of whether or not it was inverted for storage in the cache.

As shown in FIG. 2, when the system goes from a C6 to a C0 state, the Cn signal causes the contents of register 104 to toggle. (Note that circuitry generating Cn may be made to flip the register 104 sufficiently prior to actual entry of C0 or at least before the data is written into the cache to avoid incurring performance penalties. Moreover, it should be appreciated that transition from C6 to C0 is but one event where the cache is regularly being re-populated, but there may be other events that could be used to trigger toggling of the I register.) Thus, for alternating instances when the cache is re-populated, the written data is inverted. So one time it will be re-populated with non-inverted data and the next time, with inverted data, and so on.

With this embodiment, the existing C state infrastructure is used to drive the inversion process. For ease of explanation and illustration, the transitions from C6 to C0 are shown, but again, it should be appreciated that any C-state (or other state transition) that triggers a cache flush could be used (e.g. C3-6).

This approach exploits the cache-flush opportunity present in at least some of the C states. A benefit of this is that "bit-flipping" counters at the sub-array level are not needed because whether or not the data has been flipped in individual sub-arrays during normal operation does not need to be tracked. In addition, this approach may be conveniently implemented in existing designs because the inversion circuitry is "wrapped" around the cache, in an end-to-end manner, so a reconfiguration may facilitate a non-intrusive power management interface for the cache system. Note also that this approach can be applied equally well to both the data and/or tags of the cache array, as well as to other memory or cache such as register files.

Performance Based Cache De-Activation

It has been appreciated that decreasing the size of cache by a certain factor (e.g., factor of 2) as the clock frequency is reduced may have negligible impact on the overall performance of a system, as it is affected by the cache. For example, it has been observed that a decrease of CPU clock frequency by one-half, e.g., going from 2 GHz. to 1 GHz. allows for 75% of the cache to be de-activated without paying much (if any) performance penalty. (The frequency is reduced by a factor of two, but the cache can be reduced by a factor of four.) Thus, with some embodiments disclosed herein, portions of the cache are de-activated when clock frequency is reduced, e.g., for a reduced power state.

Among other benefits, this allows for a lower Vcc minimum supplied to the cache and thus, it facilitates a lower minimum Vcc guardband. (From a statistical standpoint, cache systems with larger numbers of cells require larger minimum supply voltages because they are likely to have more extreme process-variation outliers, i.e., they are likely to have worst-case cells with higher required minimum supply requirements when active. Therefore, in general, less guardband is needed as the number of active cells in a cache system decreases. Note that this works even if some of the actual worse-case cells are in partitions that remain active because from a statistical perspective, it will be highly unlikely that there would be enough "bad cells" to thwart error correction or masking methods used with most cache systems.)

In some embodiments, ACPI P-states, which define platform performance levels (e.g., operating frequency for processor or core), are used to determine a portion of the cache to be activated. This takes advantage of the fact that P-state transitions to lower power states (e.g., from P0 to P1) effectively slow the internal CPU clock without changing the bandwidth or latency of the main memory. This means that the processor can afford a larger cache "miss" rate without suffering from undue performance loss.

Figure 3:
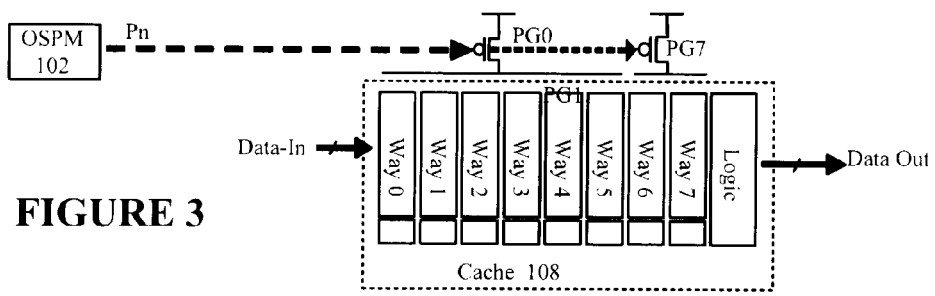
FIG. 3 is a schematic diagram showing a portion of a cache system with cache section disable circuitry to mitigate against conditions [see above] contributing to increased guardband in accordance with some embodiments.

FIG. 3 shows a circuit for de-activating portions of memory systems based on required performance so that lower voltage supplies can be used when less memory is active. In this depiction, provided with the cache system 108 are power gates (PG1 to PG8) for independent activation and de-activation of the separate cache partitions (ways in this depiction). The power gates are coupled to a control bus (Pn) that is controlled by the OSPM 102 based on the existing P state for the processor not shown) housing the cache 108. Thus, circuitry in the OSPM generates the Pn signal to activate an appropriate percentage of the cache ways based on the required system operating performance, as gleaned from the current P state. The logic is made so that when ways are de-activated, they are removed from the logical memory space. In addition, it also may be made to rotate the ways that are de-activated, so that the same ways aren't always de-activated, to mitigate against the adverse effects of aging.

Figure 4:
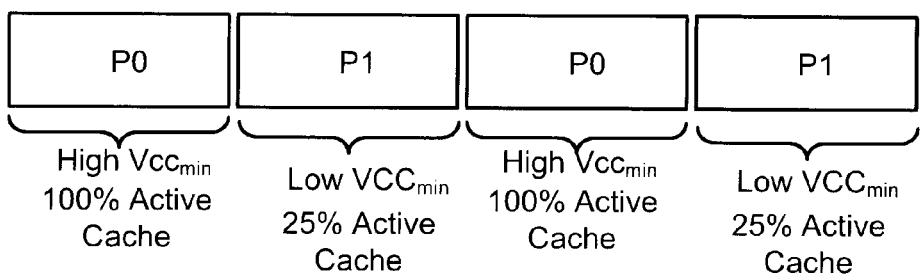
FIG. 4 is a diagram showing required cache activity based on "P" type performance state conditions.

FIG. 4 shows an example where the system transitions between P0 and P1. P0 is the highest performance state with the highest operating frequency. In this state with this example, 100% of the cache is deemed necessary for acceptable overall performance. In contrast, P1 is a lower performance state where the frequency is reduced by 50%. Thus, in this state (with the afor mentioned frequency-active cache correlation requirement), only 25% of the cache is required to be activated. Thus, when in the P1 state, the power gates are controlled so that two of the eight ways are active. In this state, the guardband for the minimum applied cache supply can be reduced, relative to the guardband needed for the P0 state.

Figure 5:
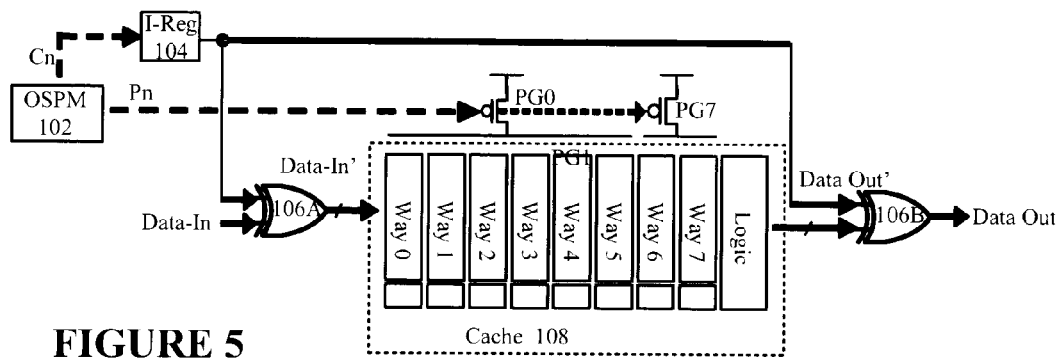
FIG. 5 is a schematic diagram of a portion of a cache system with both an inversion circuit and cache section disable circuitry to mitigate against conditions [see above] contributing to increased guardband in accordance with some embodiments.

FIG. 5 shows another embodiment that combines both the inversion and de-activation schemes from FIGS. 1 and 3. They work together to allow for an even greater reduction in the average, minimum required cache supply voltage guardband.

Figure 6:
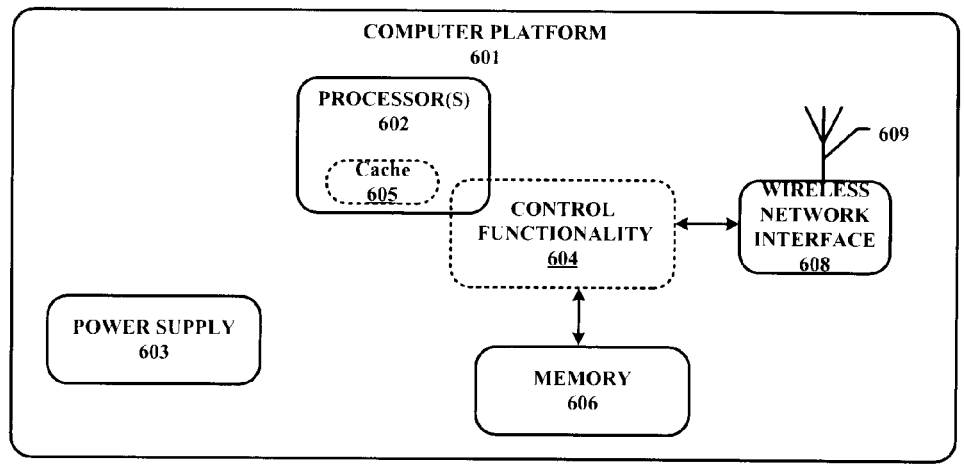
FIG. 6 is a diagram of a mobile platform system having a processor with cache in accordance with some embodiments disclosed herein.

With reference to FIG. 6, one example of a portion of a computer platform 601 (e.g., computing system such as a mobile personal computer, server, PDA, cell phone, or the like) is shown. The represented portion comprises one or more processors 602, power supply 603, interface control functionality 604, memory 606, wireless network interface 608, and an antenna 609. The power supply 603, which may include one or more AC adaptors, batteries, and/or DC-DC voltage regulators, provides DC supplies to the platform components. The processor(s) 602 is coupled to the memory 606 and wireless network interface 608 through the control functionality 604. The processor(s) may comprise any processor including a controller, single core processor and/or multi-core processor. It comprises one or more cache system(s) 605 configured for reduced Vcc guardband in accordance with some of the embodiments disclosed herein.

The control functionality may comprise one or more circuit blocks to perform various interface control functions (e.g., memory control, graphics control, I/O interface control, and the like. These circuits may be implemented on one or more separate chips and/or may be partially or wholly implemented within the processor(s) 602.

The memory 606 comprises one or more memory blocks to provide additional random access memory to the processor(s) 602. It may be implemented with any suitable memory including but not limited to dynamic random access memory, static random access memory, flash memory, or the like. The wireless network interface 608 is coupled to the antenna 609 to wirelessly couple the processor(s) 602 to a wireless network (not shown) such as a wireless local area network or a cellular network. It is shown here as a separate chip but could alternatively be incorporated into the control functionality (e.g., within the processor or in an I/O chip).

The computer platform 601 may implement a variety of different computing devices or other appliances with computing capability. Such devices include but are not limited to laptop computers, notebook computers, personal digital assistant devices (PDAs), cellular phones, audio and/or or video media players, and the like. It could constitute one or more complete computing systems or alternatively, it could constitute one or more components useful within a computing system.

In the preceding description, numerous specific details have been set forth. However, it is understood that embodiments of the invention may be practiced without these specific details. In other instances, well-known circuits, structures and techniques may have not been shown in detail in order not to obscure an understanding of the description. With this in mind, references to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the preceding description and following claims, the following terms should be construed as follows: The terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

The term "PMOS transistor" refers to a P-type metal oxide semiconductor field effect transistor. Likewise, "NMOS transistor" refers to an N-type metal oxide semiconductor field effect transistor. It should be appreciated that whenever the terms: "MOS transistor", "NMOS transistor", or "PMOS transistor" are used, unless otherwise expressly indicated or dictated by the nature of their use, they are being used in an exemplary manner. They encompass the different varieties of MOS devices including devices with different VTs, material types, insulator thicknesses, gate(s) configurations, to mention just a few. Moreover, unless specifically referred to as MOS or the like, the term transistor can include other suitable transistor types, e.g., junction-field-effect transistors, bipolar-junction transistors, metal semiconductor FETs, and various types of three dimensional transistors, MOS or otherwise, known today or not yet developed.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chip set components, programmable logic arrays (PLA), memory chips, network chips, and the like.

It should also be appreciated that in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

It should be appreciated that example sizes/models/values/ ranges may have been given, although the present invention is not limited to the same. As manufacturing techniques (e.g., photolithography) mature over time, it is expected that devices of smaller size could be manufactured. In addition, well known power/ground connections to IC chips and other components may or may not be shown within the FIGS., for simplicity of illustration and discussion, and so as not to obscure the invention. Further, arrangements may be shown in block diagram form in order to avoid obscuring the invention, and also in view of the fact that specifics with respect to implementation of such block diagram arrangements are highly dependent upon the platform within which the present invention is to be implemented, i.e., such specifics should be well within purview of one skilled in the art. Where specific details (e.g., circuits) are set forth in order to describe example embodiments of the invention, it should be apparent to one skilled in the art that the invention can be practiced without, or with variation of, these specific details. The description is thus to be regarded as illustrative instead of limiting.

What is claimed is:

1. A chip comprising:
   a memory system having static random access memory (SRAM) cells; and
   an inversion circuit having:
      a first logic to invert data written into the memory system, and
      a second logic to invert data read back out from the memory system, the first and second logics to invert data for at least some active power states when the memory system is re-activated.

2. The chip of claim 1, wherein the memory system comprises a cache.

3. The chip of claim 1, wherein the SRAM cells are formed from at least one inverter.

4. The chip of claim 1, wherein the memory system comprises a cache system partitioned into multiple partitions that may be separately activated, and wherein a number of the partitions are de-activated when a clock frequency applied to a processor containing the cache is lowered.

5. The chip of claim 1, wherein the first and second logic units are Exclusive-OR (XOR) gates.

6. The chip of claim 1, wherein the first logic unit having first and second inputs, the first input to receive a control signal from a control circuit, and the second input to receive input data for storing in the memory system.

7. The chip of claim 1, wherein the first and second logic units comprise respective plurality of logic gates coupled together in parallel.

8. The chip of claim 2, wherein the inversion circuit is coupled to a control circuit to cause the inversion circuit to invert data written into and out from the cache on alternating occasions when the cache is re-activated.

9. The chip of claim 2, wherein the second logic unit having first and second inputs, the first input to receive the control signal from the control circuit, and the second input to receive output data from the memory system.

10. The chip of claim 2, wherein the inversion circuitry is wrapped around the cache in an end-to-end manner.

11. The system of claim 4, wherein a minimum supply provided to the cache system is lowered when the processor frequency is lowered.

12. The chip of claim 4, wherein the partitions are de-activated in response to a P-state transition to a P state of a lower activity.

13. The chip of claim 8, wherein the control circuit is coupled to an operating system power management module to control the inversion circuit in response to one or more pre-defined C states.

14. The chip of claim 8, wherein the control circuit comprises a register to control the inversion circuit.

15. The chip of claim 4, wherein the register has control data that toggles each time the memory system is reactivated.

16. A mobile platform system, comprising:
a processor comprising:
a cache system having static random access memory (SRAM) cells, and an inversion circuit having:
a first logic to invert data written into the cache system, and
a second logic to invert data read back out from the cache system, the first and second logics to invert data for at least some active power states when the cache system is re-activated;
an antenna; and
a wireless interface coupled to the processor and to the antenna to communicatively link the processor to a wireless network.

17. The system of claim 16, wherein the cache system is partitioned into multiple partitions that may be separately activated, and wherein a number of the partitions are de-activated when a clock frequency applied to a processor containing the cache system is lowered.

18. The system of claim 17, wherein a minimum supply provided to the cache system is lowered when the processor frequency is lowered.

19. The system of claim 18, wherein the partitions are de-activated in response to a P-state transition to a P state of a lower activity.

* * * * *